(12) United States Patent
Kubo et al.

(10) Patent No.: US 8,503,045 B2
(45) Date of Patent: Aug. 6, 2013

(54) OVERHEAD SCANNER DEVICE, IMAGE ACQUIRING METHOD, AND COMPUTER-READABLE RECORDING MEDIUM

(75) Inventors: Satoshi Kubo, Ishikawa (JP); Yuki Kasahara, Ishikawa (JP)

(73) Assignee: PFU Limited, Ishikawa (JP)

( * ) Notice: Subject to any disclaimer, the term of this patent is extended or adjusted under 35 U.S.C. 154(b) by 263 days.

(21) Appl. No.: 13/116,097

(22) Filed: May 26, 2011

(65) Prior Publication Data
US 2011/0299136 A1    Dec. 8, 2011

(30) Foreign Application Priority Data

Jun. 3, 2010  (JP) ................................. 2010-127761

(51) Int. Cl.
*H04N 1/193* (2006.01)
*H04N 2201/0082* (2006.01)
*G03B 27/6214* (2006.01)

(52) U.S. Cl.
USPC .............................. 358/474; 355/25; 358/296

(58) Field of Classification Search
None
See application file for complete search history.

(56) References Cited

U.S. PATENT DOCUMENTS

| | | | | |
|---|---|---|---|---|
| 4,839,731 A | * | 6/1989 | Saka | 358/296 |
| 4,851,924 A | * | 7/1989 | Nakamura et al. | 358/296 |
| 5,764,379 A | * | 6/1998 | Matsuda et al. | 358/474 |
| 5,969,795 A | * | 10/1999 | Honda | 355/25 |
| 5,978,102 A | * | 11/1999 | Matsuda | 358/474 |
| 7,551,328 B2 | * | 6/2009 | Kondo et al. | 358/474 |
| 2007/0292026 A1 | | 12/2007 | Reznik et al. | |
| 2009/0268041 A1 | * | 10/2009 | Chou et al. | 348/208.6 |

FOREIGN PATENT DOCUMENTS

JP    2005-167934    6/2005

OTHER PUBLICATIONS

Ishikawa Oku Laboratory "Book Flipping Scanning", retrieved on May 25, 2010 from URL: http://www.k2.t.u—tokyo.ac.jp/vision/BookFlipScan/index-j.html, with English abstract.
Guizzo, E., "Superfast Scanner Lets You Digitize a Book by Rapidly Flipping Pages", IEEE Spectrum, Mar. 17, 2010, retrieved on May 25, 2010 from URL: http://spectrum.ieee.org/automaton/robotics/robotics-software/book-flipping-scanning.

* cited by examiner

*Primary Examiner* — Marivelisse Santiago Cordero
*Assistant Examiner* — Daryl Jackson
(74) *Attorney, Agent, or Firm* — McDermott Will & Emery LLP (57) ABSTRACT

An overhead scanner device includes an area sensor, a linear sensor, and a control unit, wherein the control unit includes an area-image acquiring unit that controls the area sensor to successively acquire a plurality of images, a feature-point extracting unit that extracts feature points from the images acquired by the area-image acquiring unit, a velocity-vector computing unit that computes a velocity vector of each of the feature points by comparing the feature points extracted by the feature-point extracting unit between the images, and a read-start determining unit that determines a read start by the linear sensor, based on the velocity vector computed by the velocity-vector computing unit.

11 Claims, 9 Drawing Sheets

OVERHEAD SCANNER DEVICE, IMAGE ACQUIRING METHOD, AND COMPUTER-READABLE RECORDING MEDIUM

CROSS-REFERENCE TO RELATED APPLICATION

This application is based upon and claims the benefit of priority from Japanese Patent Application No. 2010-127761, filed Jun. 3, 2010, the entire contents of which are incorporated herein by reference.

BACKGROUND OF THE INVENTION

1. Field of the Invention

The present invention relates to an overhead scanner device, an image acquiring method, and a computer-readable recording medium.

2. Description of the Related Art

When a plurality of documents such as a book having a number of pages are read by a conventional scanner, a user repeats the following operations: opening a target page of the documents, placing the documents on a read platen, and pressing a read start button.

JP-A-2005-167934 discloses a device provided with an area sensor and a line sensor. The device recognizes an area to be read and a size of a document from an image pre-scanned by the area sensor and causes the line sensor to read the document.

Websites of Ishikawa Komuro Laboratory and of Erico Guizzo disclose a technology for correcting a frame of a moving image photographed by a high-speed area sensor to form a scan image (see the website of Ishikawa Komuro Laboratory: "Book Flipping Scanning", URL: http://www.k2.t.u-tokyo.ac.jp/vision/BookFlipScan/index-j.html, and the website of Erico Guizzo: "Superfast Scanner Lets You Digitize a Book By Rapidly Flipping Pages", IEEE Spectrum, Mar. 17, 2010, URL: http://spectrum.ieee.org/automaton/robotics/robotics-software/book-flipping-scanning, whose websites were retrieved on May 25, 2010).

However, the conventional scanner has some problem that an operation for causing the scanner to read an image of a document is complicated or that definition of the image is low.

For example, the scanner described in JP-A-2005-167934 has a problem that the operation is complicated because the scanner is a flatbed scanner and it is therefore necessary to repeat the following operations: opening a document pressure plate, turning over a page of the document, placing the document face down, and closing the document pressure plate in order to cause the scanner to read a plurality of documents although a document size, an offset, or the like can be recognized through pre-scanning by the area sensor.

The scanners described in the websites have some problem that expensive equipment has to be used in order to read the document in a high-definition manner although a scan image can be acquired from the moving image by the overhead type high-speed area sensor.

SUMMARY OF THE INVENTION

It is an object of the present invention to at least partially solve the problems in the conventional technology.

A overhead scanner device according to one aspect of the present invention includes an area sensor, a linear sensor, and a control unit, wherein the control unit includes an area-image acquiring unit that controls the area sensor to successively acquire a plurality of images, a feature-point extracting unit that extracts feature points from the images acquired by the area-image acquiring unit, a velocity-vector computing unit that computes a velocity vector of each of the feature points by comparing the feature points extracted by the feature-point extracting unit between the images, and a read-start determining unit that determines a read start by the linear sensor, based on the velocity vector computed by the velocity-vector computing unit.

An image acquiring method according to another aspect of the present invention is executed by an overhead scanner device including an area sensor, a linear sensor, and a control unit. The method executed by the control unit includes an area-image acquiring step of controlling the area sensor to successively acquire a plurality of images, a feature-point extracting step of extracting feature points from the images acquired at the area-image acquiring step, a velocity-vector computing step of computing a velocity vector of each of the feature points by comparing the feature points extracted at the feature-point extracting step between the images, and a read-start determining step of determining a read start by the linear sensor, based on the velocity vector computed at the velocity-vector computing step.

A computer-readable recording medium according to still another aspect of the present invention stores therein a computer program for an overhead scanner device including an area sensor, a linear sensor, and a control unit. The computer program causes the control unit to execute an area-image acquiring step of controlling the area sensor to successively acquire a plurality of images, a feature-point extracting step of extracting feature points from the images acquired at the area-image acquiring step, a velocity-vector computing step of computing a velocity vector of each of the feature points by comparing the feature points extracted at the feature-point extracting step between the images, and a read-start determining step of determining a read start by the linear sensor, based on the velocity vector computed at the velocity-vector computing step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an overhead scanner device, an image acquiring method, and a computer-readable recording medium according to the present invention will be explained in detail below based on the drawings. The embodiments do not limit the invention. Specially, although a document such as a book is sometimes described as an object to be read in the present embodiment, the present inventions are not to be thus limited, but a stapled medium, a stack of single-cut sheets and the like may be used as an object to be read.

1. Configuration of the Embodiment

Figure 1:
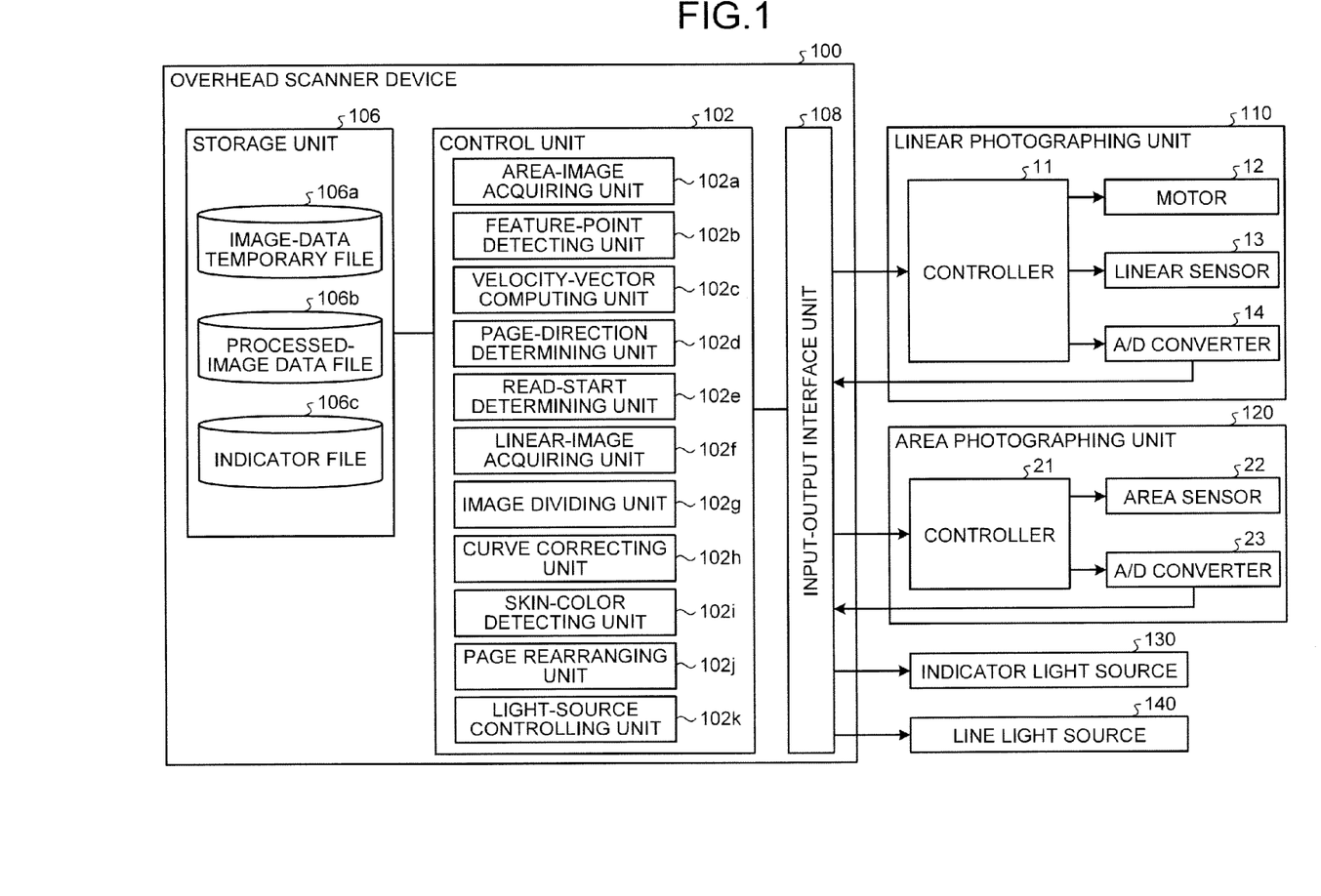
FIG. 1 is a block diagram of an example of a configuration of the overhead scanner device 100.

The configuration of an overhead scanner device 100 according to the present embodiment is explained below with reference to FIG. 1. FIG. 1 is a block diagram of an example of a configuration of the overhead scanner device 100.

As shown in FIG. 1, the overhead scanner device 100 includes at least a linear photographing unit 110, an area photographing unit 120, and a control unit 102. In this embodiment, the overhead scanner device 100 further includes a storage unit 106, an input-output interface unit 108, an indicator light source 130, and a line light source 140. Each unit of the overhead scanner device 100 is communicably connected to one another via any communication channels.

The storage unit 106 stores the various databases, files and tables. The storage unit 106 is storage means, for example, a memory device such as RAM or ROM, a fixed disk device such as a hard disk, a flexible disk, and an optical disk. The storage unit 106 stores therein computer program for executing various processes when the program is executed by CPU (Central Processing Unit). As shown in FIG. 1, the storage unit 106 includes an image-data temporary file 106a, a processed-image data file 106b, and an indicator file 106c.

Among these, the image-data temporary file 106a temporarily stores therein image data read by the linear photographing unit 110 or by the area photographing unit 120.

The processed-image data file 106b stores therein image data processed or edited by an image dividing unit 102g, a curve correcting unit 102h, and a page rearranging unit 102j, which will be explained later, from the image data read by the linear photographing unit 110.

The indicator file 106c is an indicator storage unit that stores therein a color, a shape, and the like, of an indicator such as the user's hand or finger provided by the user. Here, the indicator file 106c may store therein the color (skin color) or the shape of the user's hand or finger, for each user.

The input-output interface unit 108 has a function for connecting to the control unit 102 with the linear photographing unit 110, the area photographing unit 120, the indicator light source 130, or the line light source 140. LED light source or a monitor may be used as the indicator light source 130. The line light source 140 may be LED light source, a laser source or the like, and emit the light into an area to be read from the light source.

Figure 2:
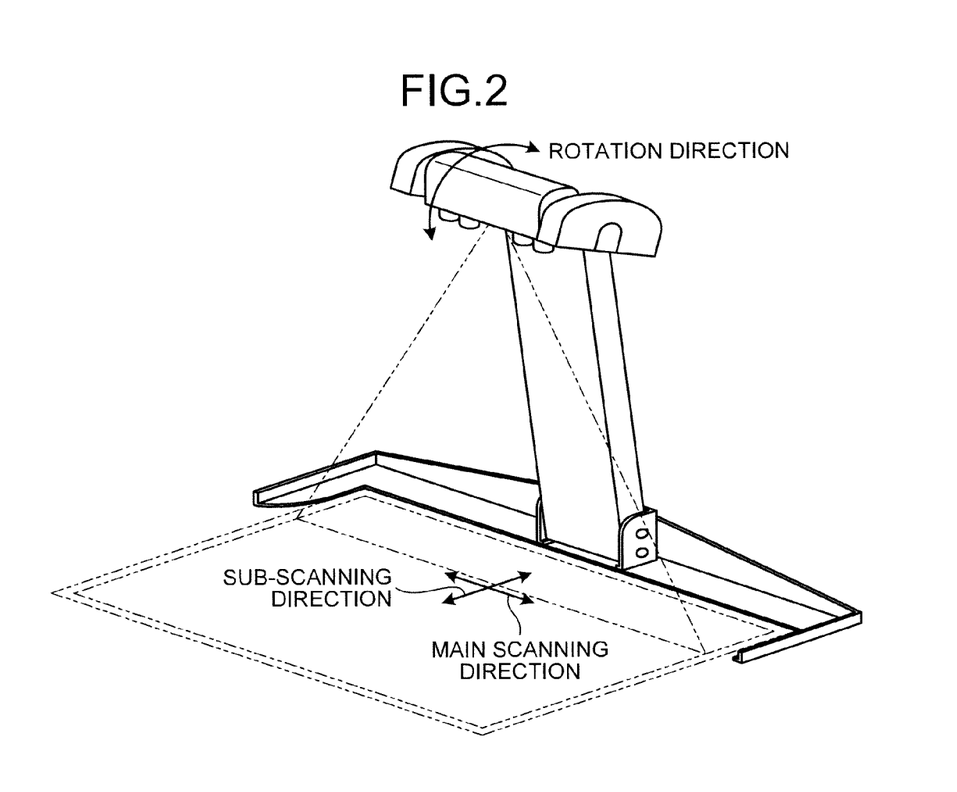
FIG. 2 is a view representing one example of an external appearance of an integrated combination of the linear photographing unit 110 and the area photographing unit 120 and also illustrating a relationship among the main scanning direction, the sub-scanning direction, and the rotation direction by the motor 12.

The linear photographing unit 110 scans a document placed face-up from above to read an image of the document using a linear sensor 13. In the present embodiment, as shown in FIG. 1, the linear photographing unit 110 includes a controller 11, a motor 12, the linear sensor 13 (line sensor), and an analog-to-digital (A/D) converter 14. The controller 11 controls the motor 12, the linear sensor 13, and the A/D converter 14 according to an instruction from the control unit 102 via the input-output interface unit 108. The linear sensor 13 photoelectrically converts the light reaching from a line in the main scanning direction of the document thereto into an analog quantity of electric charge for each pixel on the line. The A/D converter 14 converts the analog quantity of electric charge amount output from the linear sensor 13 into a digital signal, and outputs one-dimensional image data. The motor 12 is driven to rotate, and a document line as an object to be read by the linear sensor 13 thereby shifts to the sub-scanning direction. In this way, the one-dimensional image data is output from the A/D converter 14 for each line, and the control unit 102 combines these image data to generate two-dimensional image data. FIG. 2 illustrates one example of an external appearance of an integrated combination of the linear photographing unit 110 and the area photographing unit 120 and also illustrates a relationship among the main scanning direction, the sub-scanning direction, and the rotation direction by the motor 12.

As shown in FIG. 2, when the document is placed face-up and is photographed by the linear photographing unit 110 from above, the one-dimensional image data for the illustrated line in the main scanning direction is read by the linear sensor 13. Together with rotation of the linear sensor 13 driven by the motor 12 in the illustrated rotation direction, the line read by the linear sensor 13 shifts to the illustrated sub-scanning direction. This allows the two-dimensional image data for the document to be read by the linear photographing unit 110.

Referring back again to FIG. 1, the area photographing unit 120 scans a document placed face-up from above to read an image of the document using an area sensor 22. In the present embodiment, as shown in FIG. 1, the area photographing unit 120 includes a controller 21, the area sensor 22, and an analog-to-digital (A/D) converter 23. The controller 21 controls the area sensor 22 and the A/D converter 23 according to an instruction from the control unit 102 via the input-output interface unit 108. The area sensor 22 photoelectrically converts the light reaching from the document face (two-dimensional surface containing the main scanning direction and the sub-scanning direction, which are illustrated in FIG. 2) into an analog quantity of electric charge for each pixel. The A/D converter 23 converts the analog quantity of electric charge output from the area sensor 22 into a digital signal, and outputs two-dimensional image data. In this way, the two-dimensional image data is output from the A/D converter 23. In the present embodiment, because the linear sensor 13 is capable of reading a larger number of pixels per line as compared with the area sensor 22, the image read by the linear photographing unit 110 is higher definition (higher resolution) than the image read by the area photographing unit 120. Hereinafter, in order to discriminate between these images, the image read by the area photographing unit 120 may be called "area image" and the image read by the linear photographing unit 110 may be called "linear image".

The control unit 102 is a CPU or the like that performs overall control on the overhead scanner device 100. The control unit 102 includes an internal memory for storing a control program such as an OS (Operating System), programs that define various processing procedures, and necessary data. The control unit 102 performs information processing for executing various processing by these programs or the like. As shown in FIG. 1, the control unit 102 schematically includes an area-image acquiring unit 102a, a feature-point detecting unit 102b, a velocity-vector computing unit 102c, a page-direction determining unit 102d, a read-start determining unit 102e, a linear-image acquiring unit 102f, the image dividing unit 102g, the curve correcting unit 102h, a skin-color detecting unit 102i, the page rearranging unit 102j, and a light-source controlling unit 102k.

The area-image acquiring unit 102a controls the area photographing unit 120 to successively acquire a plurality of area images. For example, the area-image acquiring unit 102a controls the controller 21 of the area photographing unit 120 to repeat processes for acquiring image data photoelectrically converted by the area sensor 22 and subjected to analog-to-digital conversion by the A/D converter 23 and storing the acquired image data in the image-data temporary file (buffer) 106a. That is, the area-image acquiring unit 102a has a function of monitoring how a page of the documents is turned over or how the user's hand moves by photographing motions by the area sensor 22 to acquire successive images (moving images).

The feature-point detecting unit 102b detects feature points from the area image acquired by the area-image acquiring unit 102a. More specifically, the feature-point detecting unit 102b extracts feature points from the area image based on the image data for the area image stored in the image-data temporary file 106a by the area-image acquiring unit 102a. For example, the feature-point detecting unit 102b may extract feature points (characteristic pixels) using a known feature-point extraction method (e.g., a feature-point extraction method in a known optical flow estimation method and a known pattern recognition algorism).

The velocity-vector computing unit 102c compares the feature points extracted by the feature-point detecting unit 102b between a plurality of area images to compute a velocity vector of each of the feature points. For example, the velocity-vector computing unit 102c calculates a distance and a direction where each of the feature points extracted by the feature-point detecting unit 102b moves between a previous (time t−1) area image stored in the image-data temporary file 106a acquired by the area-image acquiring unit 102a and a newly acquired current (time t) area image, to compute a velocity vector of each of the feature points. Here, the velocity-vector computing unit 102c may track a feature point (characteristic pixel) using the optical-flow estimation method (gradient-based method) and obtain its velocity vector field through the optical flow or a behavior of an object (document or hand).

The page-direction determining unit 102d determines a page turning direction of the documents based on the velocity vector computed by the velocity-vector computing unit 102c. For example, the page-direction determining unit 102d may determine that a page is turned over from left to right when there are many rightward velocity vectors and may determine that a page is turned over from right to left when there are many leftward velocity vectors, of the velocity vectors (optical flows) of the feature points computed by the velocity-vector computing unit 102c.

The page-direction determining unit 102d may delete the velocity vector representing an unexpected movement as follows, as noise. For example, the page-direction determining unit 102d may delete the velocity vector which does not indicate the page turning direction (specified direction) of the documents, as noise. That is, the page-direction determining unit 102d may determine velocity vectors in the vertical direction as noise when the page is arranged to be turned in the horizontal direction (e.g., a book as documents is horizontal double-page spread). Likewise, the page-direction determining unit 102d may determine velocity vectors in the horizontal direction as noise when the page is turned over in the vertical direction (e.g., a book as documents is vertical double-page spread). The page turning direction (specified direction) of the documents may be preset, or the image dividing unit 102g described later may determine the direction using a direction of connecting the inflection points detected in the upper and the lower sides or the left and the right sides of the boundary (document edges) between the document and the background, based on a gradation difference of the linear images. In addition, when the magnitude (length) of the velocity vector is smaller than a predetermined threshold or when the velocity vector is not the specified direction, the page-direction determining unit 102d may delete this velocity vector as noise. In this manner, it is considered that the velocity vector having the length of less than the predetermined threshold or having the predetermined direction indicates a movement for fine adjustment of the position of the document (e.g., book). Therefore, the page-direction determining unit 102d deletes the velocity vector having the length of less than the predetermined threshold or having the predetermined direction, as noise, from the velocity vectors computed by the velocity-vector computing unit 102c, and can thereby accurately detect only a page turning operation based on the velocity vectors. In other words, the velocity vector according to the present embodiment can be used for both purposes of moving-body detection and noise removal, and thus can be used as an indicator to accurately issue a scan start trigger. The above example has explained the noise removal by the page-direction determining unit 102d, however, it is not limited thereto. Therefore, the velocity-vector computing unit 102c may remove noise by excluding the velocity vector having any one or both of a value smaller than the predetermined threshold and the predetermined direction when computing the velocity vectors.

The read-start determining unit 102e determines "read start" by the linear sensor 13 based on the velocity vectors computed by the velocity-vector computing unit 102c. For example, when the movement based on the velocity vectors computed by the velocity-vector computing unit 102c stops, the read-start determining unit 102e may determine this case as the read start by the linear sensor 13. In addition, when the indicator such as the hand and the finger expresses a specific movement (gesture such as a peace sign), the read-start determining unit 102e may determine this case as the read start by the linear sensor 13 based on the velocity vectors computed by the velocity-vector computing unit 102c. Here, the read-start determining unit 102e may manage a power supply of the linear sensor 13 for power saving. For example, when the read start by the linear sensor 13 is determined, the read-start determining unit 102e may start up a circuit of the linear sensor 13 and stop the circuit of the linear sensor 13 when the read start is not determined.

When the read-start determining unit 102e determines the read start, the linear-image acquiring unit 102f controls the linear photographing unit 110 to acquire the linear image by the linear sensor 13. For example, the linear-image acquiring unit 102f controls the controller 11 of the linear photographing unit 110 to rotate the motor 12, combines one-dimensional image data for each line being photoelectrically converted by the linear sensor 13 and subjected to analog-to-digital conversion by the A/D converter 14, to generate two-dimensional image data (image data for the linear images), and stores the generated image data in the image-data temporary file 106a.

The image dividing unit 102g divides the linear images acquired by the linear-image acquiring unit 102f to generate divided images. More specifically, the image dividing unit 102g divides the linear image based on the image data acquired by the linear-image acquiring unit 102f and stored in the image-data temporary file 106a to generate image data for the divided images. Here, the image dividing unit 102g may determine a boundary (document edges) between the document and the background based on the gradation difference of the linear image, determine respective inflection points in the upper and the lower sides of the boundary, and divide the area image into left and right images using a line connecting the inflection points. In this case, the image dividing unit 102g may function as an image cropping unit for cropping a document area within a range of the determined boundary. The image dividing unit 102g may crop the linear image within an area to be cropped surrounded due to movement of the feature points, based on histories of the velocity vectors computed by the velocity-vector computing unit 102c. That is, when the user traces the periphery of an area desired to be cropped with his/her fingertip in a unicursal manner so as to surround the area, the image dividing unit 102g may determine that its start point and end point overlap in a velocity vector group of the feature points of the user's fingertip, specify an area to be cropped, and crop the linear images within the area to be cropped.

The curve correcting unit 102h corrects each curve distortion of the images divided by the image dividing unit 102g. For example, the curve correcting unit 102h may correct the distortion of the divided image so that the curve of the upper side of the document edge becomes a horizontal line in contact with the upper side.

The skin-color detecting unit 102i detects a skin-color portion area from the divided images divided by the image dividing unit 102g. For example, the skin-color detecting unit 102i may detect a skin-color portion area from the divided images using a known pattern recognition algorism or the like based on the color (skin color) of the user's hand stored in the indicator file 106c.

The page rearranging unit 102j rearranges image data for the divided images divided by the image dividing unit 102g according to the page turning direction determined by the page-direction determining unit 102d, and stores the rearranged image data in the processed-image data file 106b. When the distortion of the divided image is corrected by the curve correcting unit 102h, the page rearranging unit 102j stores the image data for the corrected divided image. In addition, the page rearranging unit 102j deletes a divided image where the skin-color portion area is detected by the skin-color detecting unit 102i, without storing it in the processed-image data file 106b.

Figure 3:
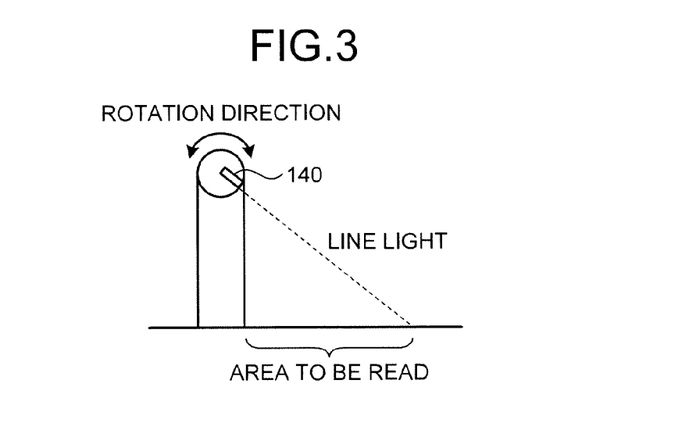
FIG. 3 is a view representing a state when the linear photographing unit 110 is viewed from its side and representing one example of the light irradiated from the line light source 140 under the control of the light-source controlling unit 102*k*.

The light-source controlling unit 102k controls the indicator light source 130 to emit light indicating a controllable state of the linear sensor 13 or controls the line light source 140 to emit light indicating an area to be read by the linear sensor 13. Here, FIG. 3 is a view representing a state when the linear photographing unit 110 is viewed from its side and representing one example of the light irradiated from the line light source 140 under the control of the light-source controlling unit 102k. As represented in FIG. 3, the light-source controlling unit 102k drives the motor 12 to rotate the line light source 140 in its rotation direction, and moves line light emitted from the line light source 140 and indicating the main scanning direction along the sub-scanning direction within the area to be read as a limit, so that the area to be read may be notified to the user.

2. Processing of the Embodiment

Examples of processing executed by the overhead scanner device 100 having the above configuration are explained below with reference to FIGS. 4 to 16.

2-1. Basic Processing

Figure 4:
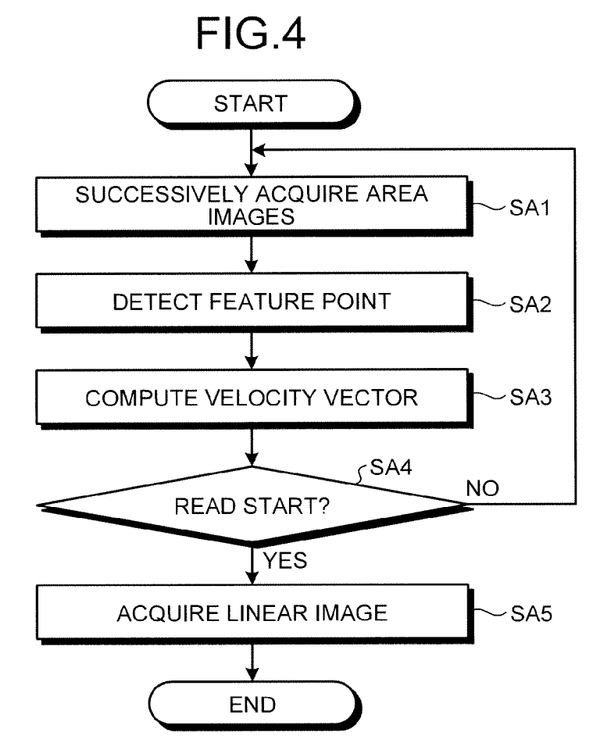
FIG. 4 is a flowchart of an example of basic processing of the overhead scanner device 100 according to the present embodiment.

An example of basic processing executed by the overhead scanner device 100 according to the present embodiment is explained below with reference to FIGS. 4 and 5. FIG. 4 is a flowchart of an example of basic processing of the overhead scanner device 100 according to the present embodiment.

As represented in FIG. 4, first, the area-image acquiring unit 102a controls the area photographing unit 120 to successively acquire a plurality of area images (Step SA1). For example, the area-image acquiring unit 102a controls the controller 21 of the area photographing unit 120 to acquire image data for the area image photoelectrically converted by the area sensor 22 and subjected to analog-to-digital conversion by the A/D converter 23 and store the acquired image data in the image-data temporary file 106a.

The feature-point detecting unit 102b detects feature points from the area image acquired by the area-image acquiring unit 102a (Step SA2). More specifically, the feature-point detecting unit 102b extracts the feature points from the area image based on the image data stored in the image-data temporary file 106a by the area-image acquiring unit 102a. For example, the feature-point detecting unit 102b may extract feature points (characteristic pixels) using the known feature-point extraction method (e.g., the feature-point extraction method in the known optical flow estimation method and the known pattern recognition algorism).

The velocity-vector computing unit 102c compares the feature points extracted by the feature-point detecting unit 102b between a plurality of the images to compute a velocity vector of each of the feature points (Step SA3). More specifically, the velocity-vector computing unit 102c calculates a distance and a direction where each of the feature points moves between a previous (time t−1) area image, which is acquired by the area-image acquiring unit 102a and stored in the image-data temporary file 106a, and a newly acquired current (time t) area image, to compute a velocity vector of each of the feature points. For example, the velocity-vector computing unit 102c may track the feature point (characteristic pixel) using the optical flow estimation method (gradient-based method) and obtain a velocity vector field through the optical flow or the behavior of an object (document, hand, etc.).

Figure 5:
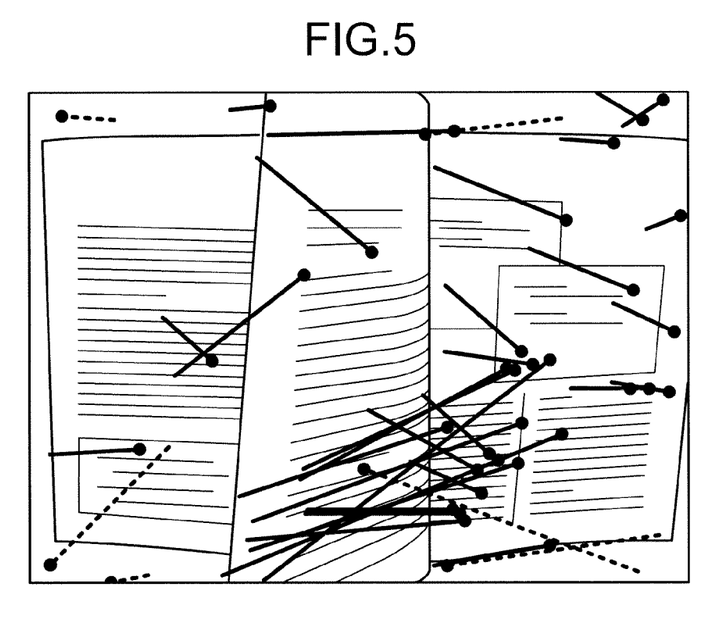
FIG. 5 is a view illustrating one example of velocity vectors (optical flows) computed between the two area images (area image at time t−1 and area image at time t) photographed while page turning.

FIG. 5 is a view illustrating one example of velocity vectors (optical flows) computed between the two area images (area image at time t−1 and area image at time t) photographed while page turning. The black solid circle in FIG. 5 represents a start point (position of the feature point at time t−1) of the velocity vector, and one end of the solid line or the broken line at the opposite side of the black solid circle represents an end point of the velocity vector (position of the feature point at time t). The solid line represents a track from right to left, and the broken line represents a track from left to right. As illustrated in FIG. 5, each velocity vector is calculated for each feature point between the two area images acquired by the area-image acquiring unit 102a, and in particular, there become more velocity vectors directed from right to left according to the movement of a page during the page turning. In this way, the optical flows enable to obtain the velocity vector field or the behavior of the object (document or hand).

The velocity-vector computing unit 102c may search and track the feature point particularly using the gradient-based method (Lucas Kanade Algorithm) of the optical flow estimation method. The gradient-based method is a method for determining a square error based on an assumption of "brightness of a characteristic pixel is constant even if time changes", and may determine a square error using, for example, the following equation. That is, the smaller the square error, similarity of feature points between two area images is higher, and, therefore, the velocity-vector computing unit 102c may compute a track connecting the feature points whose similarity is the highest, as a velocity vector.

$$SSD = \sum_{x \in W} (I(x+dx, y+dy, t+dt) - I(x, y, t))^2$$

(Here, SSD represents a square error, which is an index indicating similarity between two area images. I (x, y, t) is a pixel value in coordinates (x, y, t), and W represents set of pixels (searching area).)

Referring back again to FIG. 4, the read-start determining unit 102e determines "read start" by the linear sensor 13 based on the velocity vectors computed by the velocity-vector computing unit 102c (Step SA4). For example, when the movement based on the velocity vectors computed by the velocity-vector computing unit 102c stops, the read-start determining unit 102e may determine the read start by the linear sensor 13. In addition, when the indicator such as the hand and the finger represents a specific movement (gesture), the read-start determining unit 102e may determine the read start by the linear sensor 13 based on the velocity vectors computed by the velocity-vector computing unit 102c.

When the read-start determining unit 102e determines the read start (Yes at Step SA4), the linear-image acquiring unit 102f controls the linear photographing unit 110 to acquire the linear image by the linear sensor 13 (Step SA5). For example, the linear-image acquiring unit 102f controls the controller 11 of the linear photographing unit 110 to rotate the motor 12, combines one-dimensional image data for each line being photoelectrically converted by the linear sensor 13 and subjected to analog-to-digital conversion by the A/D converter 14, to generate two-dimensional image data, and stores the generated image data in the image-data temporary file 106a. When the read-start determining unit 102e does not determine the read start (No at Step SA4), the control unit 102 returns the process to Step SA1, repeats the processes at Step SA1 to Step SA4, and continuously monitors the page turning of the documents, the movement of the user's hand, or the like.

That is one example of basic processing in the overhead scanner device 100 according to the present embodiment.

2-2. Embodying Processing

Figure 6:
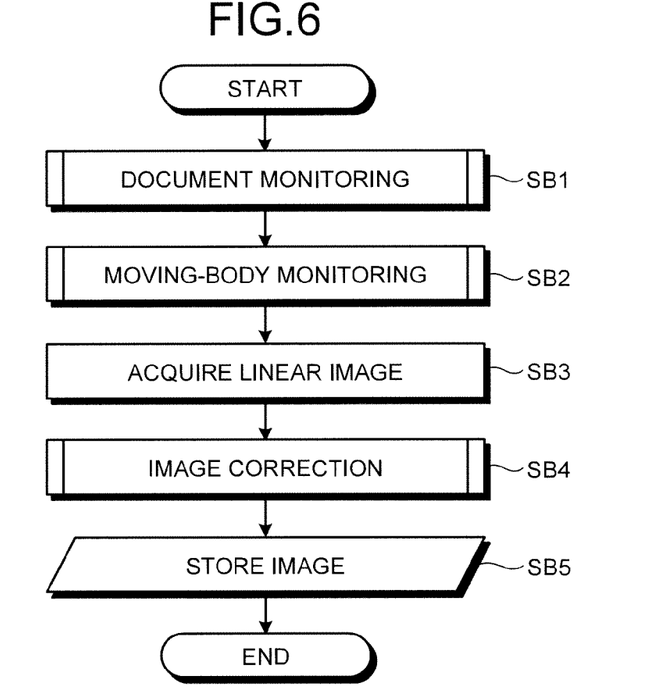
FIG. 6 is a flowchart representing one example of the embodying processing in the overhead scanner device 100 according to the present embodiment.

Subsequently, one example of embodying processing further including a page-direction determination process, an image division process, a curve correction process, a skin-color detection process, and a page rearrangement process in the basic processing will be explained below with reference to FIG. 6 to FIG. 15. FIG. 6 is a flowchart representing one example of the embodying processing in the overhead scanner device 100 according to the present embodiment.

Figure 7:
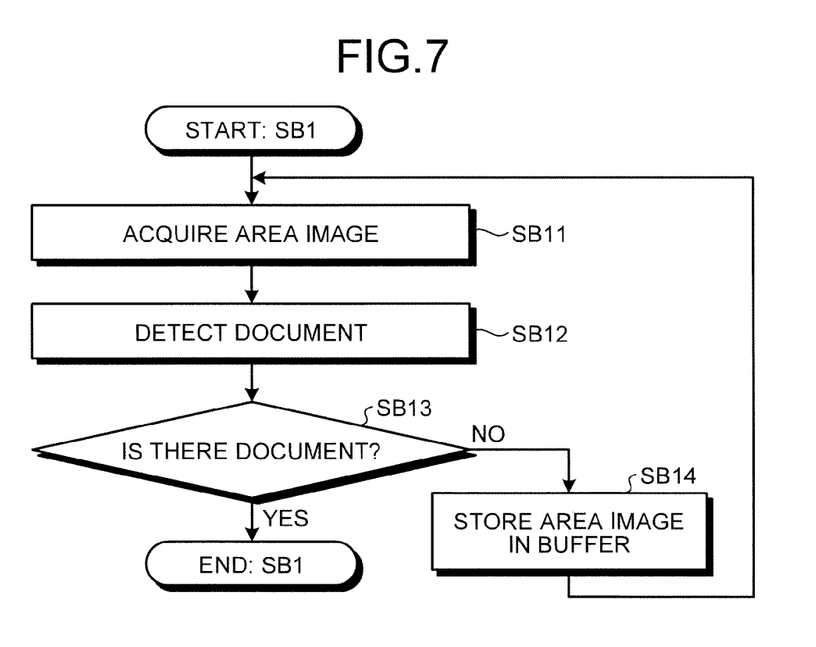
FIG. 7 is a flowchart representing a subroutine of the document monitor process.

As represented in FIG. 6, first, the control unit 102 of the overhead scanner device 100 controls the area photographing unit 120 to perform a document monitor process (Step SB1). FIG. 7 is a flowchart representing a subroutine of the document monitor process.

As represented in FIG. 7, the area-image acquiring unit 102a controls the area photographing unit 120 to acquire image data for the area image (Step SB11).

The area-image acquiring unit 102a detects the document by detecting a rectangle of white color or the like using the known pattern recognition algorism or the like, based on the image data for the acquired area image (Step SB12).

When the document cannot be detected (No at Step SB13), the area-image acquiring unit 102a stores the image data for the area image acquired this time in the image-data temporary file 106a being a buffer (Step SB14), and repeats the processes at Step SB11 to Step SB13.

Meanwhile, when the document can be detected (Yes at Step SB13), the area-image acquiring unit 102a ends the document monitor process.

Figure 8:
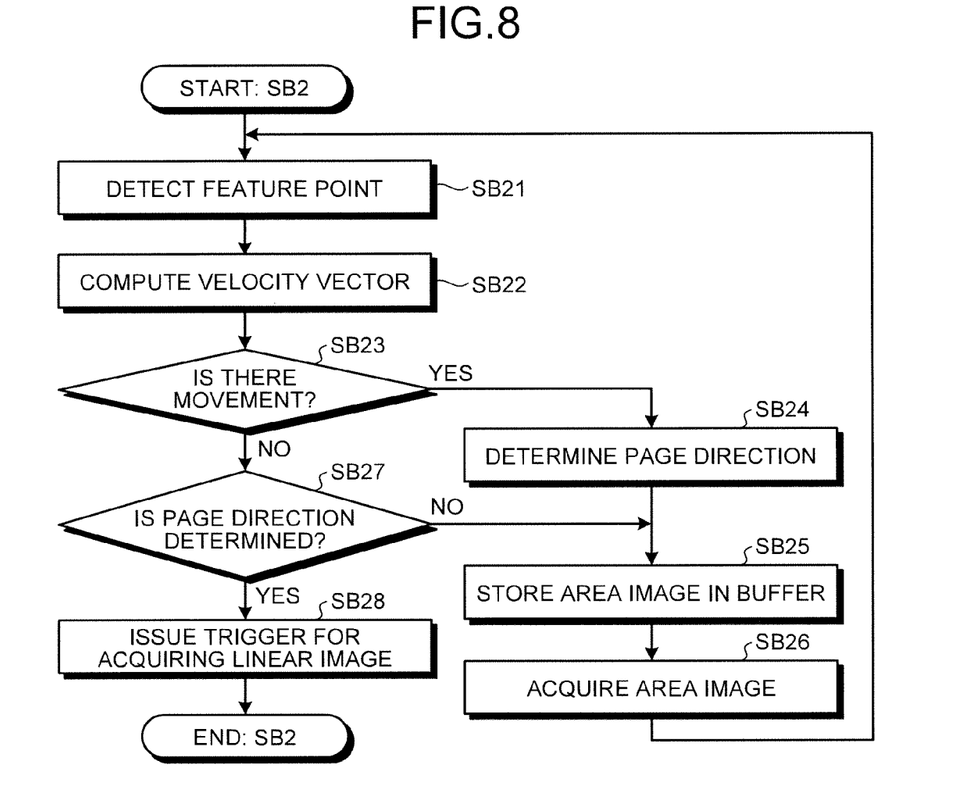
FIG. 8 is a flowchart representing a subroutine of the moving-body monitor process.

Referring back again to FIG. 6, the control unit 102 of the overhead scanner device 100 performs a moving-body monitor process (Step SB2). FIG. 8 is a flowchart representing a subroutine of the moving-body monitor process.

As represented in FIG. 8, the feature-point detecting unit 102b detects feature points from the previous (time t−1) area image which is acquired by the area-image acquiring unit 102a and stored in the image-data temporary file 106a and from the newly acquired current (time t) area image (Step SB21).

The velocity-vector computing unit 102c compares the feature points extracted by the feature-point detecting unit 102b between the area images (between the area image at time t−1 and the area image at time t) to compute a velocity vector of each of the feature points (Step SB22). For example, the velocity-vector computing unit 102c may search feature points having the highest similarity, between the area images, using the aforementioned equation for determining the square error to calculate a velocity vector (optical flow) using the track connecting between the searched feature points.

The read-start determining unit 102e determines whether any movement has been detected, based on the velocity vector computed by the velocity-vector computing unit 102c (Step SB23). For example, the read-start determining unit 102e determines whether the velocity vector computed by the velocity-vector computing unit 102c is a zero vector, whose length is zero.

When it is determined by the read-start determining unit 102e that any movement has been detected (Yes at Step SB23), the page-direction determining unit 102d determines a page direction of the document based on the velocity vectors computed by the velocity-vector computing unit 102c (Step SB24). For example, the page-direction determining unit 102d may determine that a page is turned over from left to right when there are many rightward velocity vectors and may determine that a page is turned over from right to left when there are many leftward velocity vectors, of the velocity vectors of the feature points computed by the velocity-vector computing unit 102c. The page-direction determining unit 102d may delete a velocity vector, as noise, which has a length less than a predetermined threshold or which has a predetermined direction. For example, the page-direction determining unit 102d may delete the velocity vector which does not indicate a page turning direction (specified direction) of the document, as noise. For example, when the page is arranged to be turned horizontally, the page-direction determining unit 102d may determine the velocity vector in the vertical direction as noise. The page-direction determining unit 102d may also determine the velocity vector smaller than the predetermined threshold as noise.

The area-image acquiring unit 102a stores the image data for the area image at time t acquired this time in the image-data temporary file 106a being the buffer (Step SB25).

The area-image acquiring unit 102a controls the area photographing unit 120 to newly acquire image data for an area image at time t+1 (Step SB26). Thereafter, the processes at Step SB21 to Step SB23 are repeated.

At Step SB23, when it is determined that no movement has been detected, for example, when the velocity vector is the zero vector (No at Step SB23), the area-image acquiring unit 102a determines whether the page direction has been determined by the page-direction determining unit 102d (Step SB27). When the page direction has not been determined yet (No at Step SB27), the area-image acquiring unit 102a returns the process to Step SB25, and repeats the processes.

Meanwhile, when it is determined that the page direction has been determined by the page-direction determining unit 102d (Yes at Step SB27), the area-image acquiring unit 102a issues a read-start trigger of the linear image (Step SB28). This ends the subroutine of the moving-body monitor process.

Referring back again to FIG. 6, the linear-image acquiring unit 102f controls the linear photographing unit 110 to acquire image data for the linear image by the linear sensor 13 according to the read-start trigger issued by the read-start determining unit 102e (Step SB3).

Figure 9:
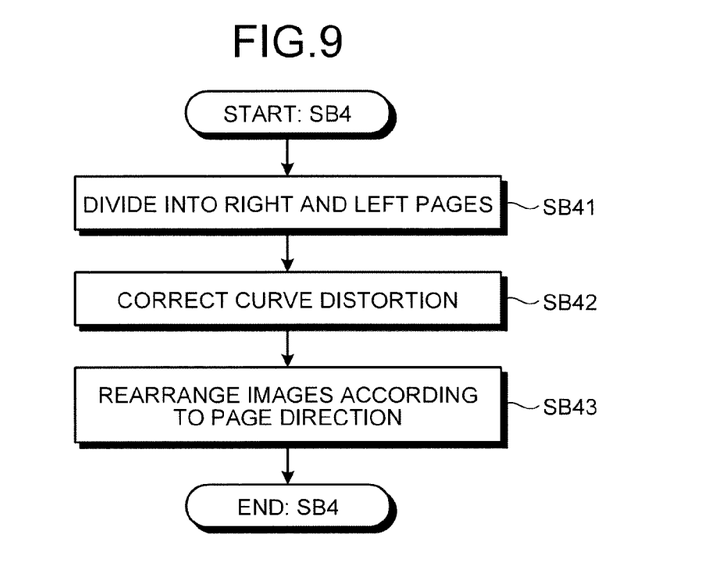
FIG. 9 is a flowchart representing a subroutine of the image correction process.

The control unit 102 of the overhead scanner device 100 performs an image correction process (Step SB4). FIG. 9 is a flowchart representing a subroutine of the image correction process.

Figure 10:
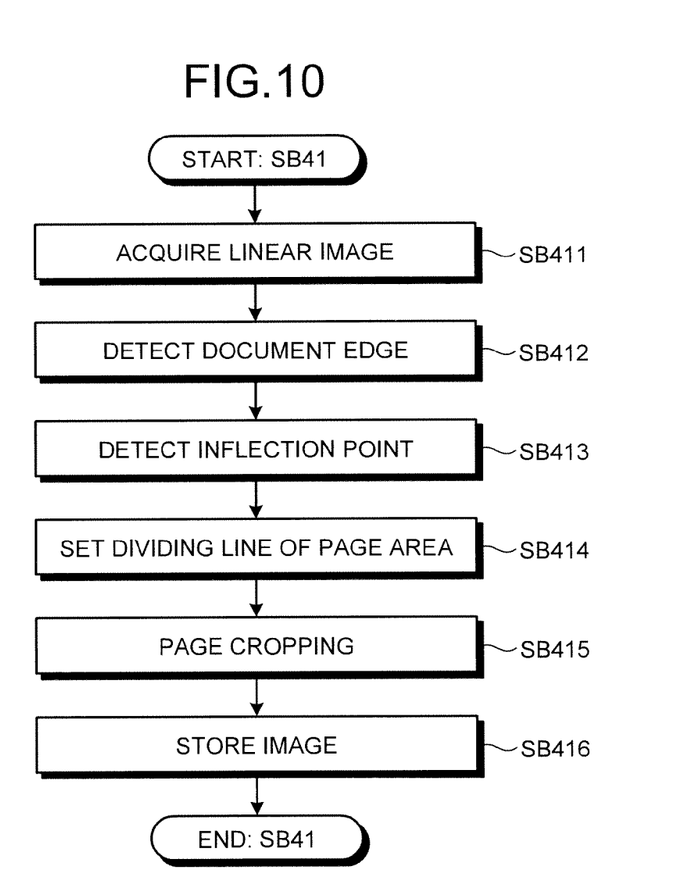
FIG. 10 is a flowchart representing the details of the image division process performed by the image dividing unit 102g.

As represented in FIG. 9, the image dividing unit 102g divides the linear images acquired by the linear-image acquiring unit 102f to generate divided images (Step SB41). FIG. 10 is a flowchart representing the details of the image division process performed by the image dividing unit 102g.

As represented in FIG. 10, the image dividing unit 102g acquires image data for the linear images acquired by the linear-image acquiring unit 102f (Step SB411), and detects a boundary (document edges) between the document and the background, based on a gradation difference of the linear images (Step SB412).

Figure 11:
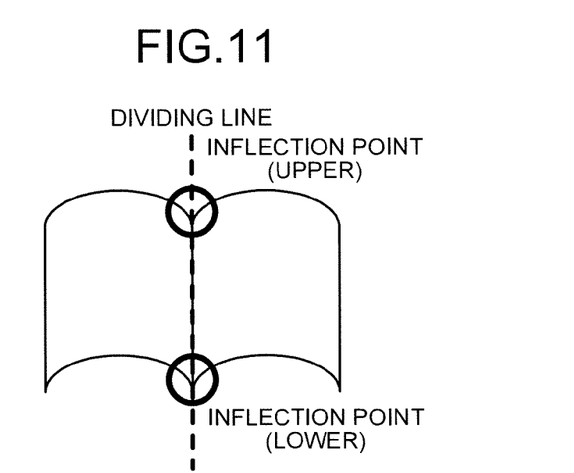
FIG. 11 is a view illustrating a relationship among the boundary (solid line portion in this figure), the inflection points (center points of each circle in this figure), and a dividing line (broken line in this figure)

The image dividing unit 102g then detects inflection points on the upper and the lower sides of the boundary from the detected boundary (Step SB413). FIG. 11 is a view illustrating a relationship among the boundary (solid line portion in this figure), the inflection points (center points of each circle in this figure), and a dividing line (broken line in this figure). As illustrated in FIG. 11, when one side of the pages is bound like a book and if the pages are opened, sheets of paper are warped, and the upper and the lower sides of the boundary are thereby smoothly deflected. However, the slopes of each edge of the two pages on the upper and the lower sides sharply change at the bound end. The image dividing unit 102g uses this property to determine the respective inflection points from the upper and the lower sides of the boundary.

The image dividing unit 102g determines a line connecting two inflection points as a dividing line and sets left and right two page areas surrounded by the dividing line and the boundary as an area to be cropped (Step SB414).

The image dividing unit 102g then extracts the divided image of the area to be cropped from the image data for the linear images to crop the page (Step SB415), and stores the divided image in the image-data temporary file 106a (Step SB416).

Figure 12:
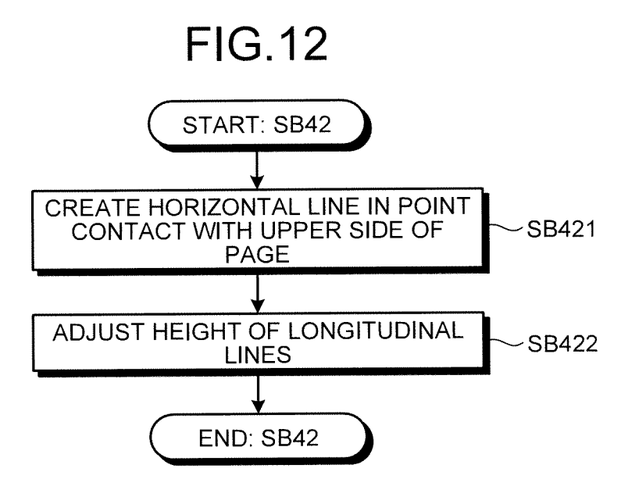
FIG. 12 is a flowchart representing the details of the curve correction process performed by the curve correcting unit 102h.

Referring back again to FIG. 9, the curve correcting unit 102h corrects curve distortion of the divided image extracted page by page by the image dividing unit 102g (Step SB42). FIG. 12 is a flowchart representing the details of the curve correction process performed by the curve correcting unit 102h.

As represented in FIG. 12, the curve correcting unit 102h creates a horizontal line in point contact with the upper side of the area to be cropped, that is, the upper side of the boundary (document edge) (Step SB421).

Figure 13:
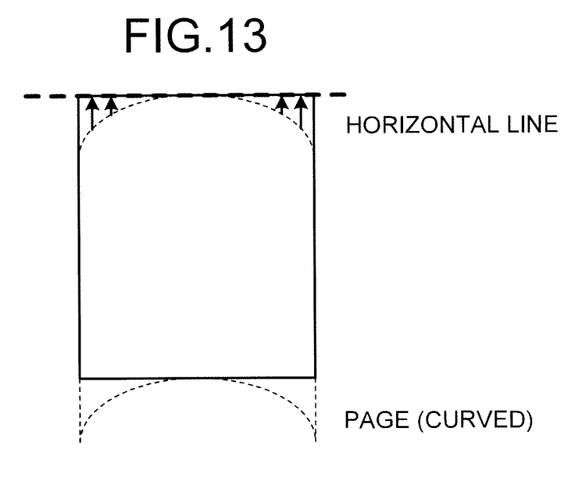
FIG. 13 is a view schematically illustrating one example of the curve correction process performed by the curve correcting unit 102h.

The curve correcting unit 102h adjusts the height of longitudinal lines so that the curve of the upper side of the area to be cropped reaches the horizontal line and corrects the distortion of the divided image (Step SB422). FIG. 13 is a view schematically illustrating one example of the curve correction process performed by the curve correcting unit 102h. In FIG. 13, the thick broken line represents the created horizontal line, the thin broken line represents an original area to be cropped (boundary of the curved page), and the solid line represents the corrected area to be cropped.

As represented in FIG. 13, as one example, the curve correcting unit 102h may correct the distortion of the divided image by dividing the divided image as the original area to be cropped into slips each of which has a one-pixel width in the longitudinal direction and vertically moving the upper edge of the longitudinal lines of the slips until the upper edge reaches the horizontal line.

Figure 14:
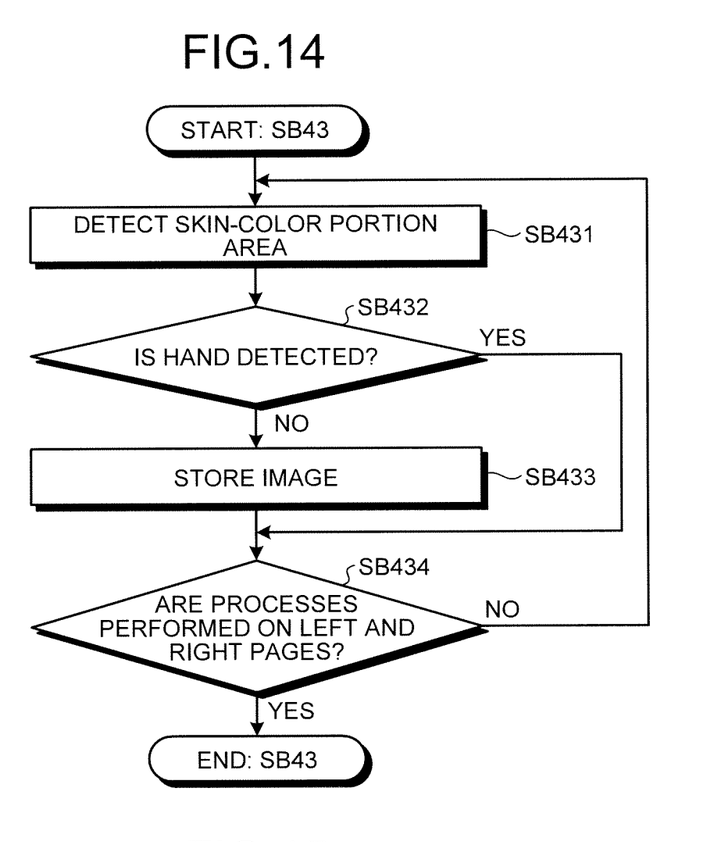
FIG. 14 is a flowchart representing the details of the page rearrangement process.

Referring back again to FIG. 9, the control unit 102 of the overhead scanner device 100 rearranges image data for the divided images, divided page by page by the image dividing unit 102g and corrected by the curve correcting unit 102h, according to the page direction determined by the page-direction determining unit 102d (Step SB43). FIG. 14 is a flowchart representing the details of the page rearrangement process.

Figure 15:
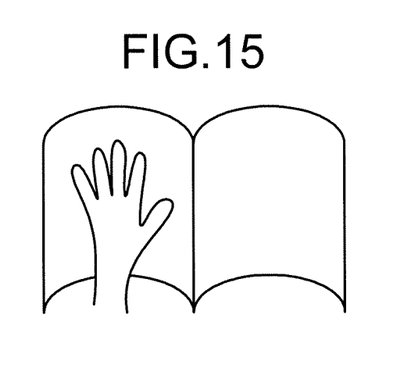
FIG. 15 is a view schematically illustrating the state in which the user puts his/her hand on an unnecessary page to be read.

As represented in FIG. 14, the skin-color detecting unit 102i detects a skin-color portion area based on the hue of the divided image after its distortion is corrected (Step SB431). For example, the skin-color detecting unit 102i detects the skin-color portion area from the divided image using the known pattern recognition algorism, based on the color (skin color) of the user's hand stored in the indicator file 106c. FIG. 15 is a view schematically illustrating the state in which the user puts his/her hand on an unnecessary page to be read. As represented in FIG. 15, when the user does not desire to read an arbitrary page, by covering the page with the hand, the linear images of the document including the hand are acquired. Thus the skin-color detecting unit 102i can detect the user's hand by detecting the skin-color area.

When the hand is not detected by the skin-color detecting unit 102i (No at Step SB432), the page rearranging unit 102j rearranges the image data for the divided image after the distortion is corrected according to the page direction determined by the page-direction determining unit 102d, and stores the rearranged image data in the processed-image data file 106b (Step SB433). For example, when the page direction determined by the page-direction determining unit 102d indicates the page turning from right to left, the page rearranging unit 102j stores the pages in the processed-image data file 106b in such an order that the left page of the double-page spread is stored therein prior to the right page thereof. When the hand is detected from the divided image by the skin-color detecting unit 102i (Yes at Step SB432), the page rearranging unit 102j deletes the image data for the divided image without storing it in the processed-image data file 106b.

The page rearranging unit 102j determines whether the processes performed on the divided images on the left and right pages have been ended (Step SB434). When any unprocessed divided image remains (No at Step SB434), then the page rearranging unit 102j repeats the processes. Meanwhile, when no unprocessed divided image remains (Yes at Step SB434), then the page rearranging unit 102j ends the page rearrangement process.

Referring back again to FIG. 6, the overhead scanner device 100 performs the processes on the document including a plurality of pages, and ends the embodying processing in the state where the image data after the various processes are performed is stored in the processed-image data file 106b (Step SB5).

That is one example of the embodying processing in the overhead scanner device 100 according to the present embodiment. In the embodying processing, a flow of one time when two-page images in the horizontal double-page spread are to be read, has been explained, however, by repeating the processes at Step SB1 to Step SB5, the other double-page spreads can be automatically and continuously read.

2-3. Power Saving Process and Light-Source Control Process

Figure 16:
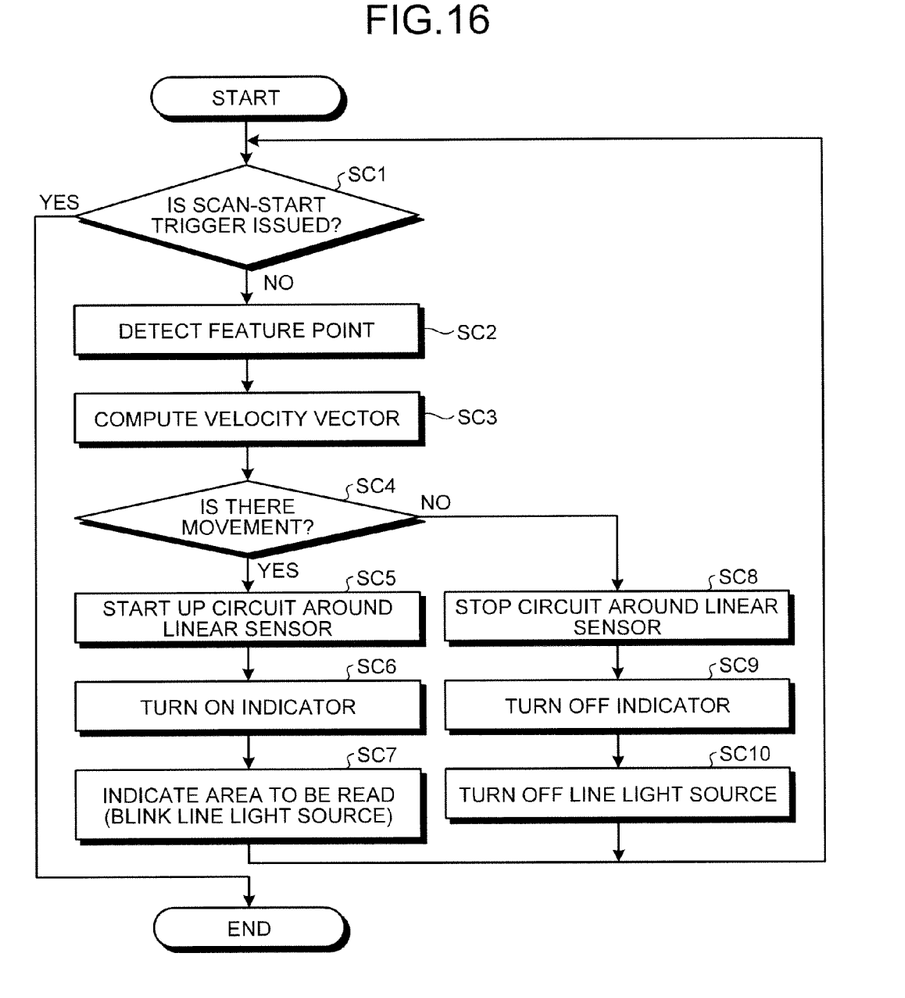
FIG. 16 is a flowchart representing one example of the power saving process and the light-source control process in the overhead scanner device 100 according to the present embodiment.

Subsequently, one example of the embodying processing further including a power saving process and a light-source control process will be explained below with reference to FIG. 16. FIG. 16 is a flowchart representing one example of the power saving process and the light-source control process in the overhead scanner device 100 according to the present embodiment.

As explained in the embodiment, the overhead scanner device 100 controls the area photographing unit 120 to perform the document monitor process and the moving-body monitor process, and issues the read-start trigger of a high-definition linear image read by the linear photographing unit 110, based on the area image acquired by the area photographing unit 120. Therefore, there is no need to always keep the linear photographing unit 110 on, and thus it is possible to achieve power saving by being in the standby status before the trigger is issued. For example, the linear image is read according to the issued trigger after the user turns over the page, however, if the user does not show a next movement, then the linear photographing unit 110 is entered into the standby status, and the overhead scanner device 100 performs the process for returning the linear photographing unit 110 from the standby status when any movement of the user is detected.

That is, as represented in FIG. 16, when the read-start trigger of the linear image is not issued by the read-start determining unit 102e (No at Step SC1), the overhead scanner device 100 performs the processes the same as these at Step SB21 to Step SB23 (Step SC2 to Step SC4). The subsequent processes are performed in parallel to the embodying processing.

When it is determined that any movement has been detected based on the velocity vectors (Yes at Step SC4), the read-start determining unit 102e starts up a circuit around the linear sensor 13 (Step SC5). Here, the circuit around the linear sensor 13 may include circuits of the controller 11, the motor 12, and the A/D converter 14, in addition to the circuit of the linear sensor 13.

The light-source controlling unit 102k controls the indicator light source 130 to turn on the light indicating the controllable state of the linear sensor 13 (Step SC6).

The light-source controlling unit 102k controls the line light source 140 in a blinking manner to irradiate the light indicating an area to be read by the linear sensor 13 (Step SC7). For example, the light-source controlling unit 102k may notify the user of the area to be read by driving the motor 12 to rotate the line light source 140 in its rotation direction and moving the line light emitted from the line light source 140, whose line indicates the main scanning direction, along the sub-scanning direction within the area to be read as a limit while blinking the line light.

Meanwhile, at Step SC4, when it is determined that no movement has been detected based on the velocity vectors (No at Step SC4), the read-start determining unit 102e stops the circuit around the linear sensor 13 (Step SC8).

The light-source controlling unit 102k turns off the indicator light source 130 (Step SC9) and turns off the line light source 140 (Step SC10).

The overhead scanner device 100 repeats the processes to achieve power saving until the read-start trigger of the linear image is issued by the read-start determining unit 102e (No at Step SC1), and notifies the user of the controllable state of the linear sensor 13 and the area to be read thereby using the light. The overhead scanner device 100 may return the process to Step SC1 each time a scan-start trigger is issued (Yes at Step SC1) and repeat the processes before a new trigger is issued.

That is one example of the power saving process and the light-source control process.

3. Summary of Present Embodiment and Other Embodiments

As explained above, according to the present embodiment, the overhead scanner device 100 controls the area photographing unit 120 to successively acquire area images, extracts feature points from the acquired area images, and compares the feature points between the area images. Based on this, the overhead scanner device 100 computes velocity vectors (optical flows) of the feature points, and determines the read start by the linear sensor 13, based on the computed velocity vectors. This enables to acquire an image excellent in reading operability of the document and with high definition. For example, the conventional scanner has to be controlled using a button incorporated in the device or through a personal computer connected to the scanner, which leads to reduction in productivity especially when a plurality of documents are to be processed. However, according to the present invention, high-definition image of the document can be acquired without requiring any particular button and tool or the like to start reading the document.

According to the present embodiment, when the movement based on the velocity vectors stops, the overhead scanner device 100 determines this case as the read start by the linear sensor 13. In this manner, the read start is automatically performed when the setting of the document is completed in such a manner that the page is turned over or the document is pressed by the hand, thus having excellent operability.

According to the present embodiment, the overhead scanner device 100 determines the page turning direction of documents based on the computed velocity vectors, controls the linear photographing unit 110 when the read start is determined to acquire the linear image of the document, divides the linear image, rearranges the divided images according to the determined page turning direction, and stores the rearranged divided images in the processed-image data file 106b. With this feature, the order of the pages is determined from the page turning movement, and the images divided for each page can be rearranged in this order. Therefore, editing works such as the division and the rearrangement of the read images on the computer are not needed, thus largely increasing the productivity. Conventionally, the user is required to perform the following operations: (1) turning over a page, (2) pressing a scan start button, (3) waiting for completion of scanning, (4) dividing the page into left and right pages, (5) correcting a curve of the page, and (6) rearranging documents according to the order of the pages and storing the rearranged documents. However, according to the present embodiment, the user only sequentially turns over pages of a book without operating the scanner, so that documents such as a book or the like can be computerized. As a result, because the scanner control does not give any trouble to the user, the productivity can be improved without bothersome operations.

According to the present embodiment, the overhead scanner device 100 determines a boundary (document edges) between the document and the background based the gradation difference of the acquired linear images, determines respective inflection points on the upper and the lower sides of the boundary, and divides the linear image into left and right images using the dividing line connecting the inflection points. This allows the images to be accurately divided page by page when the book or the like is formed with horizontal double-page spreads.

According to the present embodiment, the overhead scanner device 100 corrects the curve distortion of the divided images, rearranges the corrected divided images according to the determined page turning direction, and stores the rearranged divided images in the processed-image data file 106b. In this manner, the curve distortion that occurs when a plurality of sheets of paper are bound like a book or the like is corrected, so that an image with no distortion for each page can be acquired.

According to the present embodiment, the overhead scanner device 100 detects a skin-color portion area from the divided images, and deletes the divided image, where the skin-color portion area is detected, without storing it in the processed-image data file 106b. Thus, when the user puts the user's hand on the unnecessary page, it is possible to acquire a document image not including the unnecessary page by detecting the area of the hand on the image due to the skin color.

According to the present embodiment, when the read start by the linear sensor 13 is not determined, the overhead scanner device 100 starts up the circuits around the linear sensor 13 when any movement has been detected based on the velocity vectors, and stops the circuits around the linear sensor 13 when no movement has been detected based on the velocity vectors. This allows the linear sensor 13 to be in the standby status resulting in power saving when reading by the linear sensor 13 is not needed like the case where the document is not set.

According to the present embodiment, the overhead scanner device 100 controls the indicator light source 130 to emit light indicating the controllable state of the linear sensor 13, and controls the line light source 140 to emit light indicating the area to be read in a blinking manner. Thus, before reading, it is possible to notify the user that the linear sensor 13 becomes the readable state, or to notify the user of the area to be read by the linear sensor 13.

According to the present embodiment, the overhead scanner device 100 crops the linear images within the area to be cropped surrounded due to movement of the feature points, based on the histories of the computed velocity vectors. This allows an image to be accurately cropped along the user's intention when the user traces the periphery of the area to be cropped with his/her hand.

The embodiment of the present invention is explained above. However, the present invention may be implemented in various different embodiments other than the embodiment described above within a technical scope described in claims. For example, an example in which the overhead scanner device 100 performs the processing as a standalone apparatus is explained. However, the overhead scanner device 100 can be configured to perform processes in response to request from a client terminal which has a housing separate from the overhead scanner device 100 and return the process results to the client terminal. All the automatic processes explained in the present embodiment can be, entirely or partially, carried out manually. Similarly, all the manual processes explained in the present embodiment can be, entirely or partially, carried out automatically by a known method. The process procedures, the control procedures, specific names, information including registration data for each process, display example, and database construction, mentioned in the description and drawings can be changed as required unless otherwise specified.

The constituent elements of the overhead scanner device 100 are merely conceptual and may not necessarily physically resemble the structures shown in the drawings. For example, the process functions performed by each device of the overhead scanner device 100, especially the each process function performed by the control unit 102, can be entirely or partially realized by CPU and a computer program executed by the CPU or by a hardware using wired logic. The computer program, recorded on a recording medium to be described later, can be mechanically read by the overhead scanner device 100 as the situation demands. In other words, the storage unit 106 such as read-only memory (ROM) or hard disk drive (HDD) stores the computer program for performing various processes. The computer program is first loaded to the random access memory (RAM), and forms the control unit in collaboration with the CPU. Alternatively, the computer program can be stored in any application program server connected to the overhead scanner device 100 via the network, and can be fully or partially loaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, a magnetic optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blue-ray Disc. Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

Various databases and the like (the image-data temporary file 106a, the processed-image data file 106b, and the indicator file 106c) stored in the storage unit 106 are storage means such as a memory device such as a RAM or a ROM, a fixed disk device such as a HDD, a flexible disk, and an optical disk, and stores therein various programs, tables, and databases used for providing various processing.

The overhead scanner device 100 may be structured as an information processing apparatus such as known personal computers or workstations. Furthermore, the information processing apparatus may be structured by connecting any peripheral devices. The overhead scanner device 100 may be realized by the information processing apparatus in which software (including program or data) for executing the method according to the present invention is implemented. The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead scanner device comprising:
    an area sensor;
    a linear sensor; and
    a control unit, wherein
    the control unit includes
        an area-image acquiring unit that controls the area sensor to successively acquire a plurality of images;
        a feature-point extracting unit that extracts feature points from the images acquired by the area-image acquiring unit;
        a velocity-vector computing unit that computes a velocity vector of each of the feature points by comparing the feature points extracted by the feature-point extracting unit between the images; and
        a read-start determining unit that determines a read start by the linear sensor, based on the velocity vector computed by the velocity-vector computing unit.

2. The overhead scanner device according to claim 1, wherein when movement based on the velocity vector stops, the read-start determining unit determines this case as the read start by the linear sensor.

3. The overhead scanner device according to claim 1, further comprising a storage unit, wherein
    the control unit further includes
        a page-direction determining unit that determines a page turning direction of a document, based on the velocity vector computed by the velocity-vector computing unit;
        a linear-image acquiring unit that controls the linear sensor to acquire an image of the document when the read start is determined by the read-start determining unit;
        an image dividing unit that divides the image acquired by the linear-image acquiring unit into divided images; and
        a page rearranging unit that rearranges the images divided by the image dividing unit according to the page turning direction determined by the page-direction determining unit, and stores the rearranged images in the storage unit.

4. The overhead scanner device according to claim 3, wherein the image dividing unit determines a boundary between the document and its background based on a gradation difference of the image acquired by the linear-image acquiring unit, determines respective inflection points on upper and lower sides of the boundary, and divides the image into left and right images using a line connecting the inflection points.

5. The overhead scanner device according to claim 3, wherein the control unit further includes a curve correcting unit that corrects a curve distortion of the image divided by the image dividing unit, and
    the page rearranging unit rearranges the images corrected by the curve correcting unit, according to the page turning direction determined by the page-direction determining unit, and stores the rearranged image in the storage unit.

6. The overhead scanner device according to claim 3, wherein the control unit further includes a skin-color detecting unit that detects a skin-color portion area from the image divided by the image dividing unit, and
    the page rearranging unit deletes the image, in which the skin-color portion area is detected by the skin-color detecting unit, without storing the image in the storage unit.

7. The overhead scanner device according to claim 1, wherein when the read start by the linear sensor is not determined, the read-start determining unit starts up a circuit of the linear sensor if any movement has been detected based on the velocity vector, and stops the circuit of the linear sensor if no movement based on the velocity vector has been detected.

8. The overhead scanner device according to claim 1, further comprising a light source, wherein the control unit further includes a light-source controlling unit that controls the light source to emit light indicating a controllable state of the linear sensor or an area to be read thereby.

9. The overhead scanner device according to claim 1, wherein the control unit further includes an image cropping unit that crops the image read by the linear sensor within an area to be cropped surrounded due to movement of the feature points, based on history of the velocity vector computed by the velocity-vector computing unit.

10. An image acquiring method executed by an overhead scanner device including an area sensor, a linear sensor, and a control unit, wherein
    the method executed by the control unit comprising
        an area-image acquiring step of controlling the area sensor to successively acquire a plurality of images;
        a feature-point extracting step of extracting feature points from the images acquired at the area-image acquiring step;
        a velocity-vector computing step of computing a velocity vector of each of the feature points by comparing the feature points extracted at the feature-point extracting step between the images; and
        a read-start determining step of determining a read start by the linear sensor, based on the velocity vector computed at the velocity-vector computing step.

11. A non-transitory computer-readable recording medium that stores therein a computer program for an overhead scanner device including an area sensor, a linear sensor, and a control unit, the computer program causing the control unit to execute:
- an area-image acquiring step of controlling the area sensor to successively acquire a plurality of images;
- a feature-point extracting step of extracting feature points from the images acquired at the area-image acquiring step;
- a velocity-vector computing step of computing a velocity vector of each of the feature points by comparing the feature points extracted at the feature-point extracting step between the images; and
- a read-start determining step of determining a read start by the linear sensor, based on the velocity vector computed at the velocity-vector computing step.

* * * * *